(12) United States Patent  
Dorai et al.

(10) Patent No.: US 8,661,132 B2  
(45) Date of Patent: Feb. 25, 2014

(54) ENABLING SERVICE VIRTUALIZATION IN A CLOUD

(75) Inventors: Chitra Dorai, Chappaqua, NY (US); Raymond B. Jennings, III, Ossining, NY (US); Sambit Sahu, Hopewell Junction, NY (US); Anees A. Shaikh, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 507 days.

(21) Appl. No.: 12/789,924

(22) Filed: May 28, 2010

(65) Prior Publication Data

US 2011/0296021 A1     Dec. 1, 2011

(51) Int. Cl.  
G06F 15/16     (2006.01)  
G06F 12/00     (2006.01)

(52) U.S. Cl.  
USPC ............................................. 709/226; 709/229

(58) Field of Classification Search  
USPC .................................. 709/203, 225–229, 250  
See application file for complete search history.

(56) References Cited

U.S. PATENT DOCUMENTS

| | | | | |
|---|---|---|---|---|
| 7,814,030 B2 * | 10/2010 | Kovrigin et al. | ............... | 705/348 |
| 7,849,438 B1 * | 12/2010 | Hemmat et al. | ............... | 717/102 |
| 2004/0059611 A1 * | 3/2004 | Kananghinis et al. | ............ | 705/7 |
| 2004/0143470 A1 * | 7/2004 | Myrick et al. | ..................... | 705/7 |
| 2007/0100930 A1 * | 5/2007 | Moon et al. | .................... | 709/200 |
| 2007/0203766 A1 * | 8/2007 | Adler et al. | ........................ | 705/7 |
| 2008/0126163 A1 * | 5/2008 | Hogan et al. | ...................... | 705/8 |
| 2008/0172263 A1 * | 7/2008 | Heyman | ........................... | 705/7 |
| 2010/0125664 A1 * | 5/2010 | Hadar et al. | .................. | 709/224 |
| 2010/0182983 A1 * | 7/2010 | Herscovici et al. | ........... | 370/338 |
| 2010/0250746 A1 * | 9/2010 | Murase | ......................... | 709/226 |
| 2011/0072487 A1 * | 3/2011 | Hadar et al. | ...................... | 726/1 |
| 2011/0106501 A1 * | 5/2011 | Christian et al. | .................. | 703/1 |

OTHER PUBLICATIONS

WebSphere World, Trade6 released, http://www.websphere-world.com/modules.php?name=News&file=article&sid=1466.  
Cloud computing, Wikipedia, http://en.wikipedia.org/wiki/Cloud_computing, pp. 1-17.  
Open Virtualization Format, http://www.vmware.com/appliances/getting-started/learn/ovf.html, pp. 1-2.  
IBM, Tivoli Service Automation Manager, http://www-01.ibm.com/software/tivoli/products/service-auto-mgr/, pp. 1-2.

* cited by examiner

*Primary Examiner* — Zarni Maung  
(74) *Attorney, Agent, or Firm* — Louis J Percello; Ryan, Mason & Lewis, LLP

(57) ABSTRACT

A service-level specification for information technology services is obtained from a user. The service-level specification is mapped into an information technology specific deployment plan. Information technology specific resources are deployed in accordance with the information technology specific deployment plan to provide the information technology services.

15 Claims, 7 Drawing Sheets

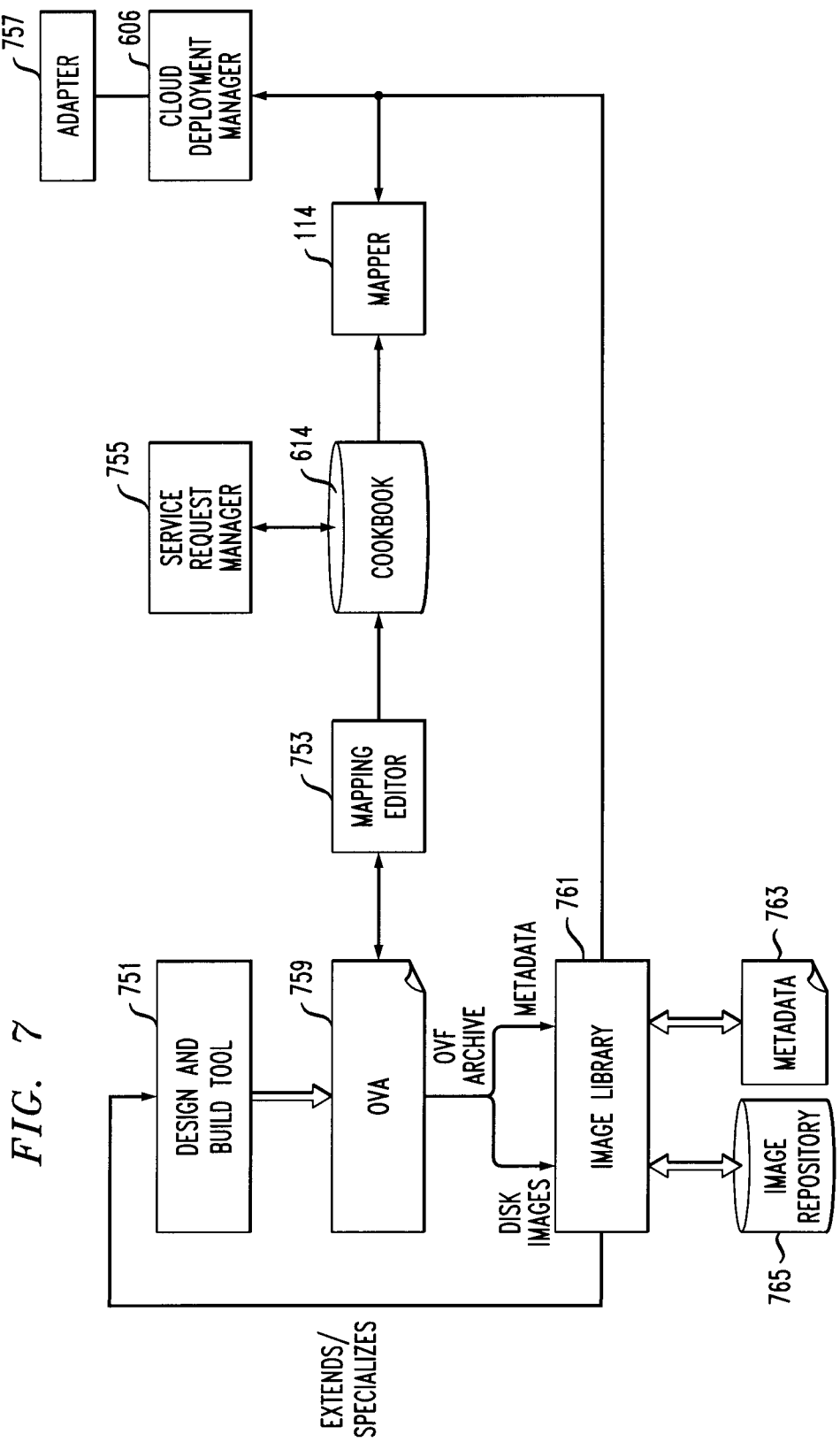

ENABLING SERVICE VIRTUALIZATION IN A CLOUD

FIELD OF THE INVENTION

The present invention relates to the electrical, electronic and computer arts, and, more particularly, to cloud computing and the like.

BACKGROUND OF THE INVENTION

Cloud computing has gained lot of attention from information technology (IT) industries and has the potential to change the way IT services are managed and provided. Although there are several definitions emerging to define Cloud computing, infrastructure level virtualization has emerged as the most popular and is typical of commercial offerings. In this version of Cloud, computing resource level abstractions are supported where a user can request computing resources. The cloud provider supports resource level virtualization to provide computing resources as virtualized resources. The Cloud user then logs into the provided virtualized resources and deploys its applications. In this abstraction, the user need not worry about owning and managing physical level resources. The focus is on deployment of applications—typically as virtual appliances.

SUMMARY OF THE INVENTION

Principles of the invention provide techniques for enabling service virtualization in a cloud. In one aspect, an exemplary method includes the steps of obtaining from a user a service-level specification for information technology services; mapping the service-level specification into an information technology specific deployment plan; and deploying information technology specific resources in accordance with the information technology specific deployment plan to provide the information technology services.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:

ease of deployment of services and/or applications in a cloud environment expediting migration of traditional applications into a cloud reducing the skill level required for deploying applications in a cloud significantly reducing errors that may be introduced when deploying applications into a cloud These and other features, aspects and advantages of the invention will become apparent from the following detailed description of illustrative embodiments thereof, which is to be read in connection with the accompanying drawings.

BRIEF DESCRIPTION OF THE DRAWINGS

FIG. 7 depicts exemplary service definition creation.

DETAILED DESCRIPTION OF PREFERRED EMBODIMENTS

Figure 1:
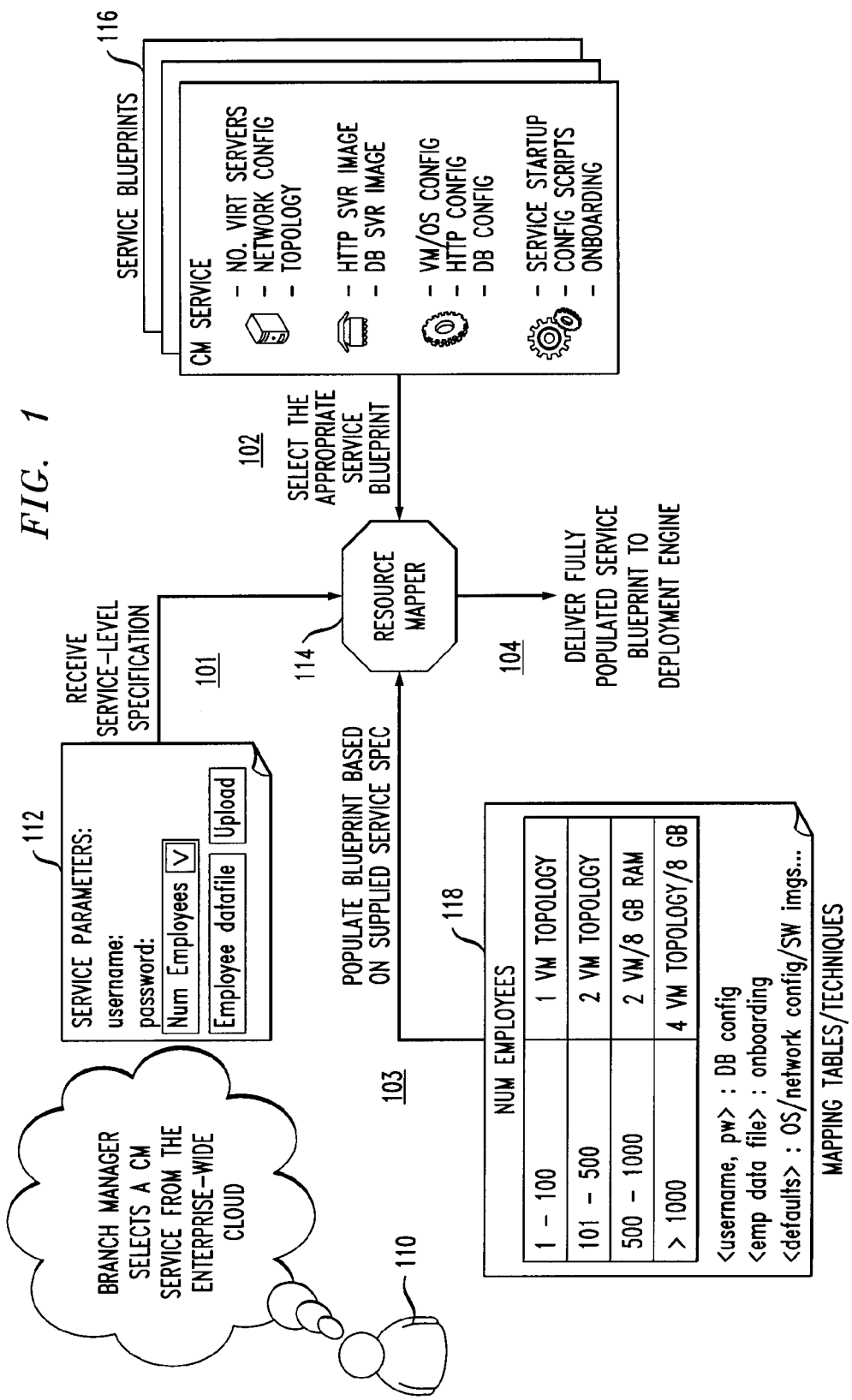
FIG. 1 shows exemplary mapping and associated deployment plan generation.

As noted, Cloud computing has gained lot of attention from information technology (IT) industries and has the potential to change the way IT services are managed and provided. Although there are several definitions emerging to define Cloud computing, infrastructure level virtualization has emerged as the most popular and is typical of commercial offerings. In this version of Cloud, computing resource level abstractions are supported where a user can request computing resources. The cloud provider supports resource level virtualization to provide computing resources as virtualized resources. The Cloud user then logs into the provided virtualized resources and deploys its applications. In this abstraction, the user need not worry about owning and managing physical level resources. The focus is on deployment of applications—typically as virtual appliances.

While such virtualization at the resource level is quite promising and useful, the deployment of applications on top of such resources requires quite a bit of application level knowledge from the users. It still does not provide the service level abstraction for simplifying the deployment and provisioning of services where a service may include multiple applications, and where each application may require a set of virtual resources. The configuration of a reasonable service such as a corporate management service, desktop service, online trading, business analytics, and the like, is quite complex to manage.

One or more embodiments of the invention provide a method and apparatus to virtualize services by hiding away all the lower level image-specific configuration details. The user needs to specify a service in terms of its functionality, not in terms of detailed image configurations. It decouples the service level definition from actual image level deployments, through use of a resource mapper discussed further hereinbelow.

One significant aspect of one or more embodiments of the invention is that it decouples service specification from actual service deployment. The user is exposed a description of a service in terms of its functionality and a set of parameters that describe its functionalities. These parameters are used by users to specify the service requirements, as opposed to image specific parameters or any specific deployment of the service. One or more embodiments of the invention use this service definition and map this service definition to a deployment plan in a set of steps. Some of the steps may include a choice of a service architecture that defines a topology. Then, based on the topology choice, different components of the service are determined, which would be appropriate to meet the specified request. The mapper component uses a priori derived mapping knowledge to map the requirement into a deployment plan. The deployment plan is specified in terms of virtual-appliance-specific configurations, so that the infrastructure cloud can be used to instantiate the service using the deployment plan.

In one or more embodiments, this decoupling has several implications:

1. It simplifies the configuration knowledge required from a user. The user only needs to know the service specification from the usage viewpoint, not from the deployment viewpoint.
2. As it decouples "what" from "how," a service deployment plan is automatically derived in the background, which takes into account the sizing, service level, and any security requirements. In addition, the Cloud provider can, in at least some instances, reflect the current cloud state while deriving such a mapping.
3. Elasticity can be supported in at least some cases. Using this abstraction as the demand increases, the configuration could be adapted, possibly by changing service topology, components of the elements in the chosen topology, and the like.
4. Automated scaling of resources can be supported with this notion of service virtualization.

By way of a brief review, when using resource level virtualization within the cloud computing paradigm, the user specifies requirements and a virtual (as opposed to physical) machine is set up for the user in response. Generally, login access and simple primitives are provided. The user may be required to know quite a bit of detail with regard to images, configuration details, and the like. Thus, in a current cloud computing environment, the user may need to know detailed technical and configuration information ("how") beyond the basic definition of the services ("what") required. In one or more embodiments, the user need only specify "what," e.g., word processing for 20 people, desire to store customer contact data, on-line stock brokerage with certain number of transactions per unit time, and so on.

One or more embodiments advantageously provide a structured, systematic way to separate "what" a service provides from "how" it is provided. One or more instances provide service-level virtualization to convert logical and/or uses-centric representations of services into information technology (IT) deployments.

In one or more embodiments, service definition extensions simplify deployment. The input is a service definition extension in business and/or service terms, for example the number of transactions added to the (OVF) (Open Virtualization Format) description of a service. The output is an appropriate cloud deployment solution with an appropriate topology, fixing relevant variations in topology and management plans and resource assignments based on the input for a mapper. The mapper, to be discussed in greater detail below, transforms input parameters to solutions based on cookbook intelligence. One embodiment of a cookbook is an application where an administrator or service creator sets up the rules for how the mapper derives a solution based on service definition extension(s); in other cases an a posteriori rather than an a priori learning process is employed wherein learning takes place from faults that may be encountered.

In some instances, other supported extensions include post install customization and updates, service health monitoring, and management extensions.

Thus, in one or more embodiments, the "what" aspect is captured in a service definition, and is translated into the "how" via suitable mapping using expert knowledge, expert-created cookbooks, and so on. Cloud level application program interfaces (APIs) then automatically instantiate the desired cloud solution.

With respect to the figures, note that MaaS stands for management as a service, "DB" stands for database, "HTTP" stands for hypertext transfer protocol, "VM" stands for virtual machine, "OS" stands for operating system, "RAM" stands for random access memory, "virt" stands for virtual, "SW" stands for software, "config" stands for configuration, and "svr" stands for server.

Figure 5:
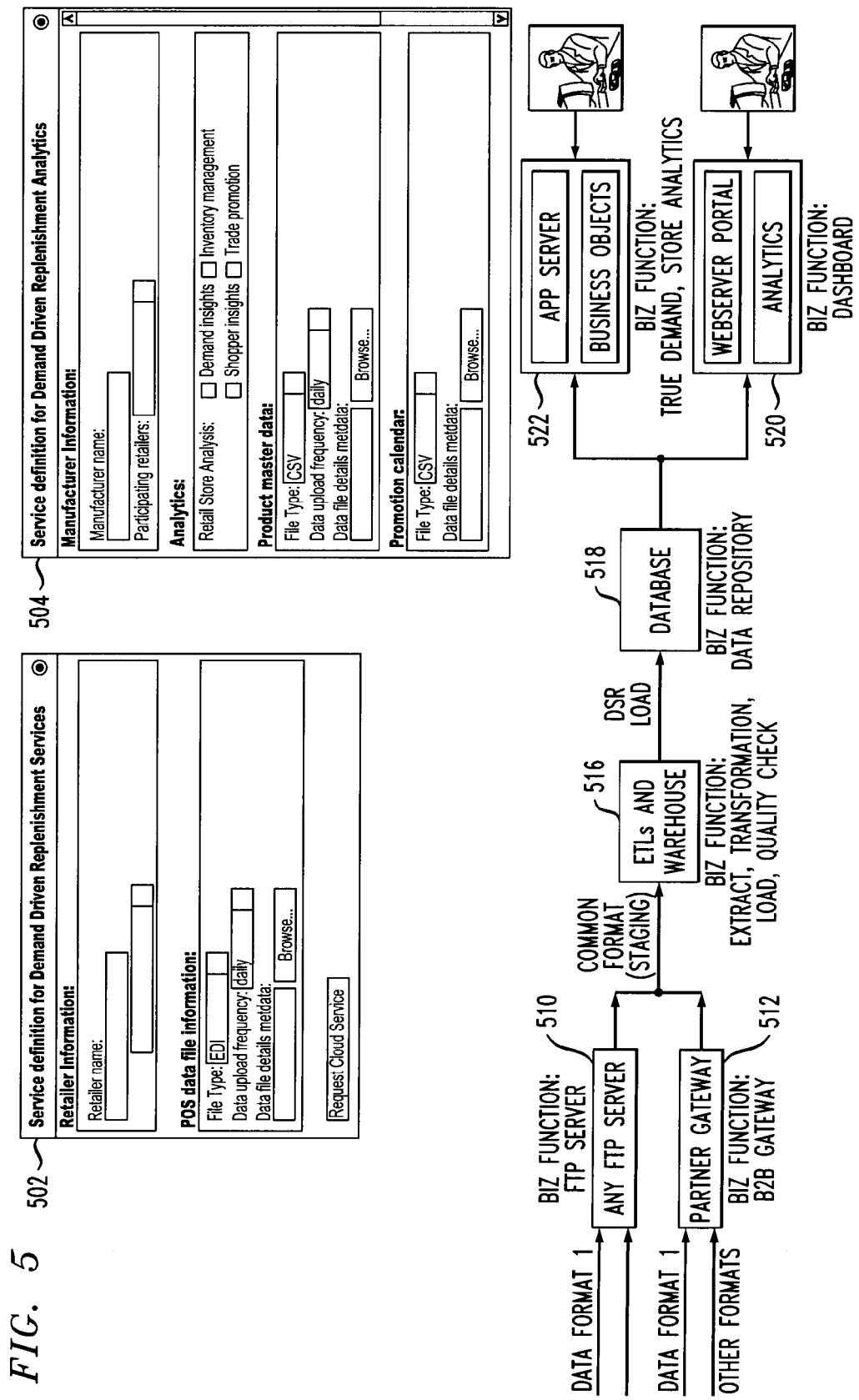
FIG. 5 depicts an exemplary component stack and service representations.

FIG. 5 shows an example of component stack and service representations. A retail user might access a graphical user interface 502. A manufacturing user might access a graphical user interface 504. In each case, the user need only specify the "what," e.g., the retail user specifies desire to conduct a daily upload of a point-of-sale (POS) data file in Electronic Data Interchange (EDI) format, and the manufacturing user specifies desire to conduct a daily upload of a product master data file in Comma Separated Value (CSV) format.

The actual cloud implementation ("how") is transparent to the users. As shown at the bottom of the figure, a file transfer protocol (FTP) server 510 and a business-to-business gateway 512 receive input in one or more data formats (EDI 852 is a non-limiting example) and output in a common format (e.g., EDI 852) to block 516 which carries out a load in connection with database 518. Block 520 represents analytic functionality in dashboard form, while block 522 represents demand and store analysis functionality provided, for example, by an application server or the like. It is to be emphasized that the specifics depicted in FIG. 5 represent a non-limiting example. Furthermore, IBM WebSphere® software products are a non-limiting example of software to set up, operate and integrate electronic business applications across multiple computing platforms; IBM WebSphere® Application Server (WAS) software is a non-limiting example of application server software; and DB2® software is a non-limiting example of database software (all registered marks of International Business Machines Corporation, Armonk, N.Y., USA). Blocks 520, 522 represent the functionality experienced by the cloud end user(s).

Figure 6:
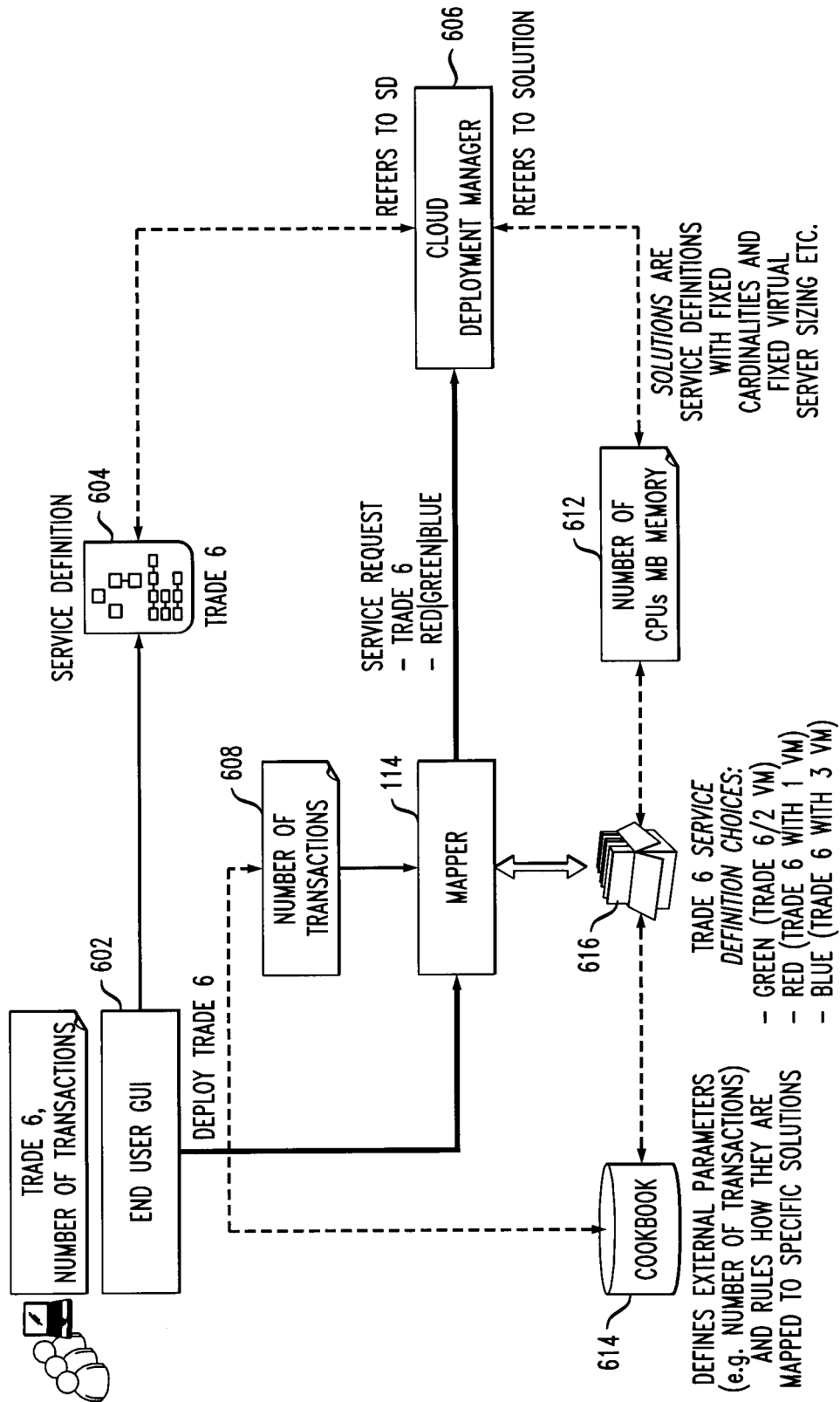
FIG. 6 depicts exemplary service mapping aspects pertaining to the life cycle of service deployment.

FIG. 6 depicts exemplary service mapping aspects pertaining to the life cycle of service deployment. In a non-limiting service deployment phase example, an end-user selects a service from the service catalog portal by using end-user GUI 602 (502, 504 are non-limiting examples). The user interacts with the service-level representation. Note the service definition (SD) 604; in this case, for the "trade6" performance benchmarking tool for IBM WEBSPHERE® software, available from International Business Corporation, Armonk, N.Y., USA. The fulfillment process invokes the mapper 114 for such requests. Note that the user only had to specify "trade6" and a characteristic parameter, here, the number of transactions 608. The mapper 114 uses a cookbook 614 to map the request to a service definition, fixes variations and parameter selections and passes control back to the fulfillment process to complete the service instance deployment (with cloud deployment manager 606). The cookbook 614 is an application (or a database) that stores expert knowledge about the service (in a well-structured form) to provide information to do the mapping. As seen at 616 in FIG. 6, there are three possible service definition choices using the "trade6" program (a non-limiting example of an application program), namely, green using trade 6 with two virtual machines; red using trade 6 with one virtual machine, and blue using trade 6 with three virtual machines. For example, less than 1,000 transactions per second might call for red; more than 1,000 but less than 10,000 transactions per second might call for green; and more than 10,000 might call for blue. These values and choices can be based on the work of experts. In deploying the actual solution, as shown at 612, cloud deployment manager 606 refers to a solution (a service definition with fixed cardinalities and fixed virtual server sizing, and so on).

FIG. 7 presents a non-limiting example of service definition creation. The skilled artisan will appreciate that OVA (OVF plus archive) and OVF (open virtualization framework) are emerging standards to allow the cloud API to interpret image details (in cloud deployment manager 606). Design and build tool 751 extends and/or specializes disk images and/or metadata in image library 761. The output can be specified in OVA, as at 759, with disk images and metadata stored in library 761, as seen at 765, 763. Mapping editor 753 interacts with OVA specifications 759 and stores knowledge in cookbook 614. Note that in some embodiments, mapping editor 753 can be omitted and OVA block 759 interfaces directly to cookbook 614; however, in a preferred approach, mapping editor 753 is included to afford the opportunity to make manual changes. Service request manager maintains cookbook 614. Mapper 114 interacts with cloud deployment manager 606 and cookbook 614 as described above. Adapter 757 is provided for purposes of translating syntax to other pieces of software having their own formats, i.e., mapping external language to internal language.

The details of the mapping and associated deployment plan generation are described in FIG. 1 with reference to a non-limiting example. This example illustrates how an illustrative embodiment of the invention works for a sample service called corporate management (CM) service. While the CM service is a fairly complex service that requires several virtual appliances, the user 110 needs to know only service parameters 112, such as the number of employees, the transaction rate, and so on. In the non-limiting example of FIG. 1, the user 110 is a branch CM manager, who selects an CM service from the enterprise-wide cloud. As shown at 101, user 110 creates a service-level specification, including service parameters 112. The same is provided to resource mapper 114.

The mapper 114 is a significant component of one or more embodiments of the invention. It uses a knowledge base to translate requirement 112 into a deployment architecture, as shown at 102. Note that a deployment architecture is a component of a service blueprint. A service blueprint may include sufficient detail for a cloud deployment manager to instantiate a solution. A deployment architecture might specify for example, a one-tiered, two-tiered, or three-tiered service. Once the architecture is fixed (e.g., three tiers—web tier, application tier, and service tier), inside each tier there will be certain details that need to be specified and these details will also be part of the blueprint. In the example, mapper 114 next automatically chooses an appropriate HTTP server, backend database, network topology, startup service configuration and data on-boarding, as shown at 103, using mapping tables and/or mapping techniques 118. This can be carried out, for example, using a "cookbook" approach, leveraging knowledge of best practices from field experts. Fine tuning can be carried out during deployment. When a service offering or definition is created, some of the mapping knowledge can be added to a database—for example, a simple look-up table can be used in some instances (e.g., for transaction time of 1100 milliseconds, use these types and numbers of components). As seen at 104, the fully populated service blueprint is then delivered to the deployment engine.

Figure 2:
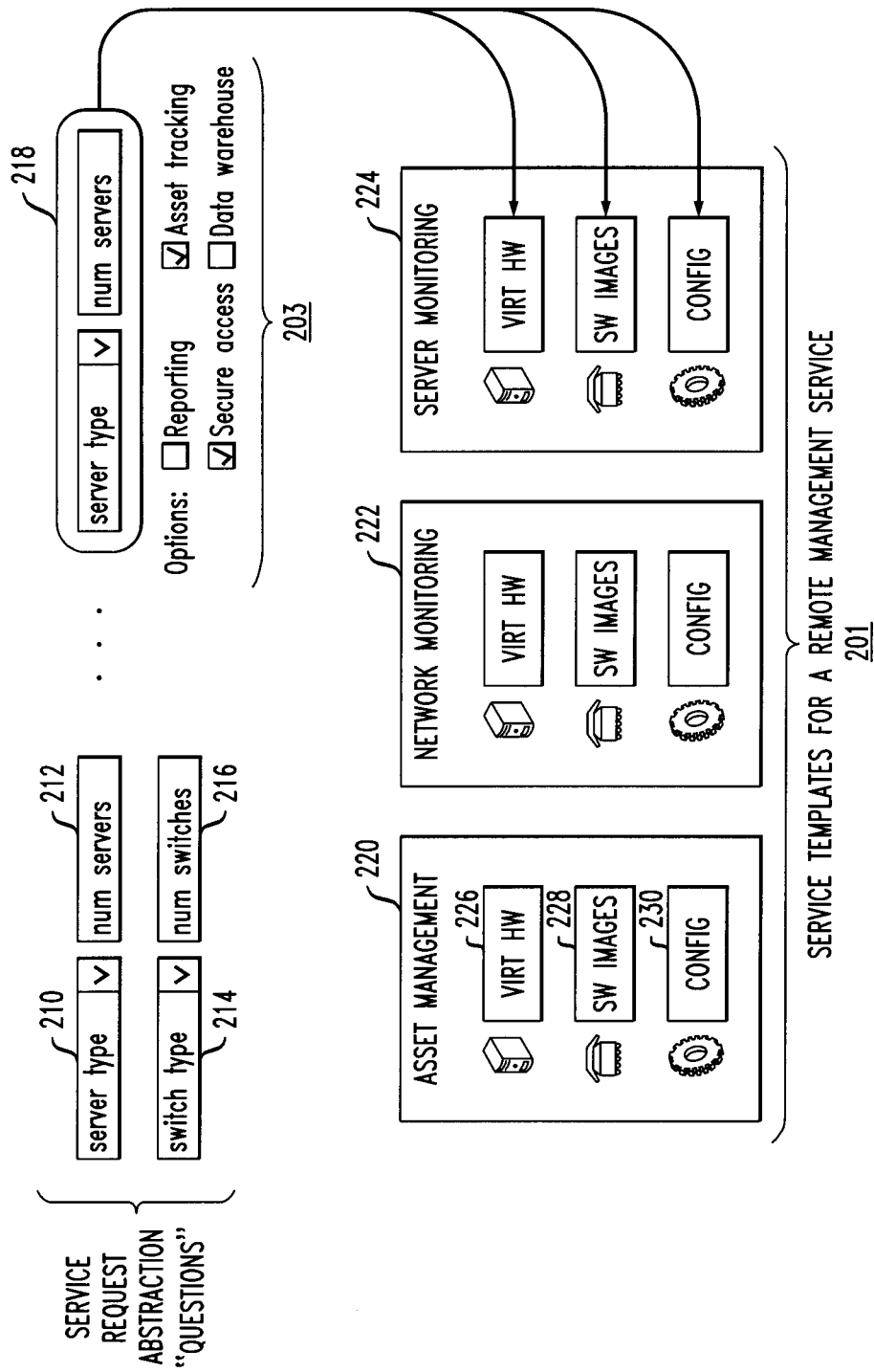
FIG. 2 shows an exemplary resource mapper framework.

With reference to FIG. 2, resource mapper 114 provides a framework for service designers to present a simplified request abstraction to subscribers (an alternate view of the service model). Advantageously, knowledge regarding the mapping of service abstractions to service templates (also referred to as blueprints) is captured and modeled. The mapping can then be executed at service request time, using a controller such as cloud deployment manager 606 or the like. In the example of FIG. 2, service request abstraction questions include server type 210, number of servers 212, switch type 214, number of switches 216, and the like. Options 203 may include, for example, reporting, asset tracking, secure access, and data warehousing. Here, asset tracking and secure access have been selected. As shown at 218, service request values are mapped to service template parameters. Such knowledge is, in effect, provided by a service designer, encoded, and represented in a suitable software program. In the example of FIG. 2, there are a number of service templates 201 for a remote management service. In the non-limiting example depicted, these include asset management 220, network monitoring 222, and server monitoring 224. Each includes virtual hardware 226, software images 228, and configuration details 230. FIG. 2 shows how to develop the information in the service blueprints 116 so that in the future, users can just specify functionally what they need without needing to know the details of how many servers, how much memory, and so on.

Figure 3:
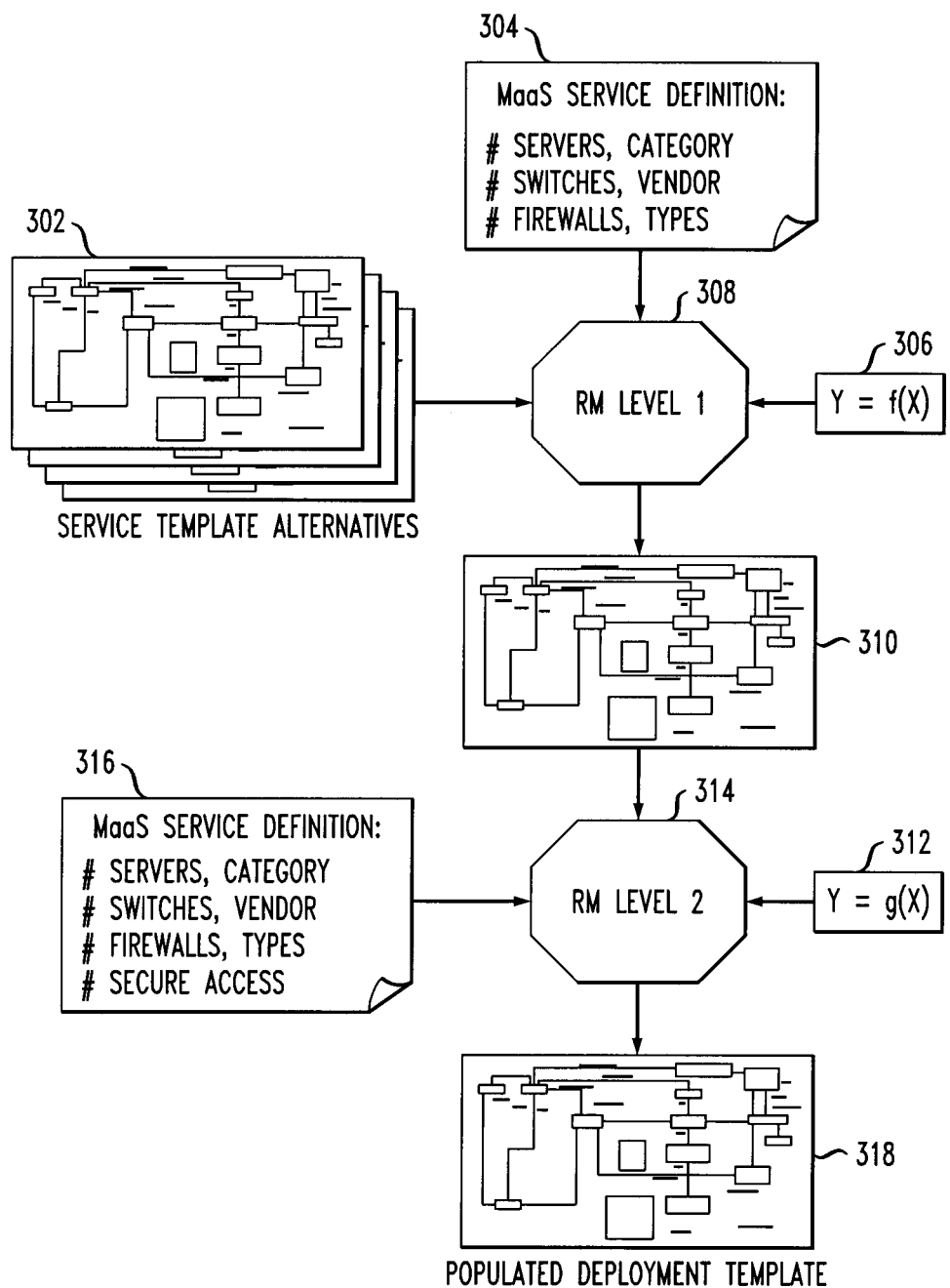
FIG. 3 shows exemplary mapping details and associated meta data.

FIG. 3 illustrates mapping details and associated meta data, and in particular, how mapping can be expressed so that the service creator can use the generic framework for expressing the mapping between service definition(s) 304, 316 and service deployment plan details. Each service has a set of service templates 302 with topology, configuration, software properties, and the like. In a non-limiting example, the service templates are created in association with service automation management software (by way of example and not limitation, IBM Tivoli® Service Automation Manager (TSAM) available from International Business Machines Corporation, Armonk, N.Y., USA)). An "RM" is a service definition template. Note level-one service definition template 308. At mapping level one, fix one or more service templates 302. Mapping meta data will have a set of questions for users that specify inputs $X_1, X_2, \ldots, X_k$. Assume that the variation parameters to fix a template are $Y_1, Y_2, \ldots, Y_m$. As seen at 306, the service creator defines $Y_i = f(X_1, X_2, \ldots, X_k)$ as the mapping relationships for each $i=1, \ldots, m$ (for example, based on the knowledge and experience of field experts or domain experts; when such individuals create an offering, they will provide appropriate guidelines). The RM 308 determines $Y_1, \ldots, Y_m$ based on the user input to service definition questions, using this mapping. The RM 308 chooses the best matched service template 302 as the solution choice 310. Note that "k" is the number of parameters in the service definition and "m" is the number of parameters in the template; $X_1$ through $X_k$ are the inputs and the variation parameters Y are functions of the k inputs.

At mapping level two, fix variations inside a template 310. The RM 314 determines the variation parameters for the chosen template 310, where mapping functions 312 are supplied by the service creator (based on knowledge of experts in the field). Based on service definition 316, template 310, and mapping functions 312, level-two RM 314 creates populated deployment plan (template) 318.

Mapping is preferably specified in a generic format, using one or more of tables, range based indicator functions, equations, and the like.

Cookbook 614 may be created and maintained, for example, by manager 755, service creator(s), and/or administrator(s). Typically mapping editor 753 definition extensions and mapping between extensions and cloud deployment manager 606 service definitions would be created by the service creator in the life cycle of publishing a service. Service definitions extensions can be maintained in service request manager 755 as part of service definitions (they could be kept, for example, as OVF extensions).

Mapper 114 comprises the code, stored on a computer-readable storage medium, that allows bypassing fulfillment steps to determine cardinalities, parameters in service definition and virtual resource sizings, and variations in management plans. In some instances, fulfillment workflow of manager 606 passes control to mapper engine 114 to choose a cloud deployment manager service definition and fix open cardinalities and parameters. Mapper engine 114 passes back control to the cloud deployment manager fulfillment workflow.

One or more embodiments thus provide one or more of:
- A method and apparatus for decoupling the service requirement specification from the deployment specification
- A method and apparatus for virtualizing service creation in a cloud
- A method and apparatus for supporting adaptive application deployment in a cloud transparent to the user
- A method and apparatus for translating a service requirement into a cloud deployment plan Given the discussion thus far, it will be appreciated that, in general terms, an exemplary method, according to an aspect of the invention, includes the step of obtaining, from a user, a service-level specification for information technology services as shown at 101. Cloud computing services are a non-limiting example of information technology services. This step could be carried out, for example, by a suitable user interface module 602; the user interface module could prompt the user 110 with appropriate service request abstraction questions as shown, for example, at 502, 504. Note that, as used herein, a "service-level specification" is concerned with functionality and associated functionality-specifying parameters and is not concerned with image specific parameters or any specific deployment of the service. An additional step 102 includes mapping the service-level specification into an information technology specific deployment plan. This step could be carried out, for example, by mapper 114 accessing a knowledge base 614.

A further step as described with respect to manager 606 includes deploying information technology specific resources in accordance with the deployment plan to provide the information technology services. This step could be carried out, for example, by cloud deployment manager 606.

In some instances, subscriber (user) 110 is prompted to provide the service-level specification 112 by presenting a simplified request abstraction to the subscriber 110, as described with respect to elements 502, 504, 602, and accompanying text. The service-level specification 112 is obtained from the user 110 in response to the prompting, as per step 101. The simplified request abstraction includes functionality (e.g., "trade6") and one or more functionality-describing parameters (e.g., number of transactions 608).

In some cases, the mapping step includes mapping (e.g., with mapper 114) the service-level specification to a service definition 616 in accordance with a knowledge base 614, and fixing variations and parameter selections associated with the service definition to obtain the deployment plan (e.g., as a solution as defined with respect to FIG. 6 and its accompanying text).

In one or more embodiments, an additional step includes populating the knowledge base 614; for example, as described with respect to FIG. 7. This could be done, for example, by interviewing experts regarding best practices, implementing an automated computer-learning technique, or the like.

In some cases, the cloud computing resources can be dynamically re-allocated based on a change in the at least one functionality-describing parameter. That is, as the workload changes, because "what" is decoupled from "how," the resources provided to a client by the cloud can shrink and grow as required (for example, as web traffic to the client's web site decreases or increases).

Advantageously, in one or more embodiments, because of decoupling and the use of intelligent mapping, complexity from the user's point of view is reduced and support is provided for an optimized on-demand computing environment.

In some instances, the information technology services are cloud computing services and the information technology specific resources are cloud computing resources. In such cases, the mapping step can include mapping the service-level specification to a service definition in accordance with a knowledge base; fixing variations and parameter selections associated with the service definition to obtain a cloud (i.e., virtual) deployment plan; and mapping the cloud deployment plan to the information technology specific (i.e., physical) deployment plan.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
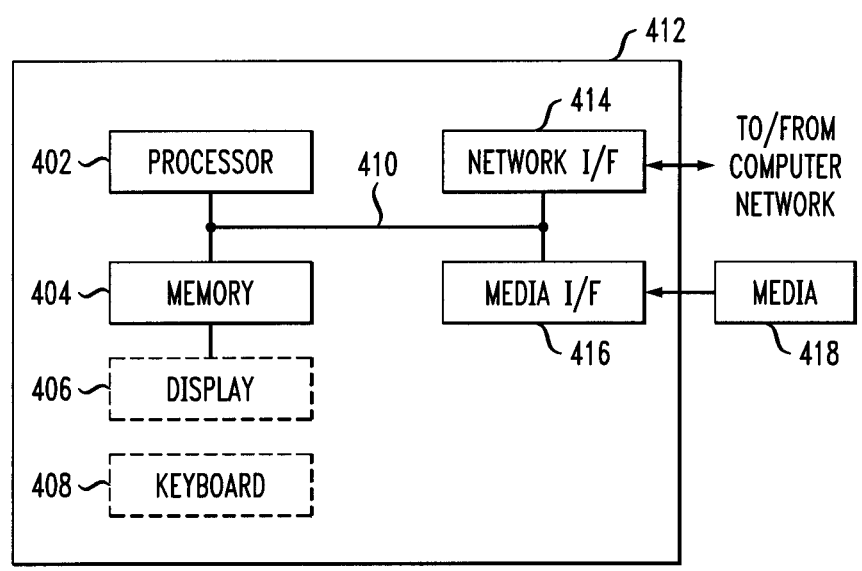
FIG. 4 depicts a computer system that may be useful in implementing one or more aspects and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a user interface module, a mapper module, and a deployment engine module. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having computer readable program code embodied therewith, said computer readable program code comprising:
    computer readable program code configured to obtain from a user a service-level specification for information technology services;
    computer readable program code configured to map said service-level specification into an information technology specific deployment plan; and
    computer readable program code configured to deploy information technology specific resources in accordance with said information technology specific deployment plan to provide said information technology services, wherein said information technology specific deployment plan is derived from a selected service template, wherein the selected service template is selected from a plurality of service template alternatives and has a plurality of unpopulated parameters that are a best match to parameters that are functions of inputs by the user in the service-level specification.

2. The computer program product of claim 1, further comprising computer readable program code configured to prompt said user to provide said service-level specification by presenting a simplified request abstraction to said user, wherein said service-level specification is obtained from said user in response to said prompting, and wherein said simplified request abstraction comprises functionality and at least one functionality-describing parameter.

3. The computer program product of claim 2, wherein said computer readable program code configured to map comprises:
    computer readable program code configured to map said service-level specification to a service definition in accordance with a knowledge base; and
    computer readable program code configured to fix variations and said unpopulated parameters associated with said service definition to obtain said deployment plan.

4. The computer program product of claim 3, wherein said knowledge base comprises at least a priori knowledge.

5. The computer program product of claim 3, wherein said knowledge base comprises at least a posteriori knowledge.

6. The computer program product of claim 3, further comprising computer readable program code configured to populate said knowledge base.

7. The computer program product of claim 2, further comprising computer readable program code configured to dynamically re-allocate said information technology specific resources based on a change in said at least one functionality-describing parameter.

8. The computer program product of claim 1, wherein:
    said information technology services comprise cloud computing services; and
    said information technology specific resources comprise cloud computing resources.

9. The computer program product of claim 8, wherein said computer readable program code configured to map comprises:

computer readable program code configured to map said service-level specification to a service definition in accordance with a knowledge base;

computer readable program code configured to fix variations and said unpopulated parameters associated with said service definition to obtain a cloud deployment plan; and computer readable program code configured to map said cloud deployment plan to said information technology specific deployment plan.

10. An apparatus comprising:

a memory; and at least one processor, coupled to said memory, and operative to:

obtain from a user a service-level specification for information technology services;

map said service-level specification into an information technology specific deployment plan; and deploy information technology specific resources in accordance with said information technology specific deployment plan to provide said information technology services, wherein said information technology specific deployment plan is derived from a selected service template, wherein the selected service template is selected from a plurality of service template alternatives and has a plurality of unpopulated parameters that are a best match to parameters that are functions of inputs by the user in the service-level specification.

11. The apparatus of claim 10, wherein said at least one processor is further operative to provide said service-level specification by presenting a simplified request abstraction to said user, wherein said service-level specification is obtained from said user, and wherein said simplified request abstraction comprises functionality and at least one functionality-describing parameter.

12. The apparatus of claim 11, wherein said at least one processor is operative to map by:

mapping said service-level specification to a service definition in accordance with a knowledge base; and fixing variations and parameter selections associated with said service definition to obtain said deployment plan.

13. The apparatus of claim 10, wherein:

said information technology services comprise cloud computing services;

said information technology specific resources comprise cloud computing resources;

said at least one processor is operative to map by:

mapping said service-level specification to a service definition in accordance with a knowledge base;

fixing variations and said unpopulated parameters associated with said service definition to obtain a cloud deployment plan; and mapping said cloud deployment plan to said information technology specific deployment plan.

14. The apparatus of claim 10, further comprising a plurality of distinct software modules, each of the distinct software modules being embodied on a computer-readable storage medium, and wherein the distinct software modules comprise a user interface module, a mapper module, and a deployment engine module; wherein:

said at least one processor is operative to obtain by executing said user interface module;

said at least one processor is operative to map by executing said mapper module; and said at least one processor is operative to deploy by executing said deployment engine module.

15. An apparatus comprising:

means for obtaining from a user a service-level specification for information technology services;

means for mapping said service-level specification into an information technology specific deployment plan; and means for deploying information technology specific resources in accordance with said information technology specific deployment plan to provide said information technology services, wherein said information technology specific deployment plan is derived from a selected service template, wherein the selected service template is selected from a plurality of service template alternatives and has a plurality of unpopulated parameters that are a best match to parameters that are functions of inputs by the user in the service-level specification.

* * * * *